US008776942B2

(12) United States Patent
Ishii et al.

(10) Patent No.: US 8,776,942 B2
(45) Date of Patent: Jul. 15, 2014

(54) POWER STEERING DEVICE AND HOUSING FOR ELECTRIC POWER STEERING DEVICE

(71) Applicant: Hitachi Automotive Systems Steering, Ltd., Saitama (JP)

(72) Inventors: Shozo Ishii, Kanagawa (JP); Yoshiki Takai, Atsugi (JP); Susumu Kimoto, Atsugi (JP); Satoru Muto, Kawasaki (JP)

(73) Assignee: Hitachi Automotive Systems Steering, Ltd., Saitama (JP)

( * ) Notice: Subject to any disclaimer, the term of this patent is extended or adjusted under 35 U.S.C. 154(b) by 0 days.

(21) Appl. No.: 13/783,488

(22) Filed: Mar. 4, 2013

(65) Prior Publication Data

US 2013/0248278 A1 Sep. 26, 2013

(30) Foreign Application Priority Data

Mar. 22, 2012 (JP) ................................. 2012-066091

(51) Int. Cl.
*B62D 5/04* (2006.01)
(52) U.S. Cl.
USPC ............................ 180/444; 180/443; 180/446
(58) Field of Classification Search
USPC ......................................... 180/444, 443, 446
See application file for complete search history.

(56) References Cited

U.S. PATENT DOCUMENTS

| 6,364,049 B1* | 4/2002 | Iwasaki et al. ................. 180/444 |
| 2001/0035310 A1* | 11/2001 | Tsuboi et al. ................. 180/444 |
| 2004/0168849 A1* | 9/2004 | Honaga et al. ................ 180/444 |
| 2009/0301804 A1* | 12/2009 | Saito et al. ..................... 180/444 |

FOREIGN PATENT DOCUMENTS

JP 2001-173756 6/2001

\* cited by examiner

*Primary Examiner* — Joseph M Rocca
*Assistant Examiner* — Marlon Arce
(74) *Attorney, Agent, or Firm* — Antonelli, Terry, Stout & Kraus, LLP.

(57) ABSTRACT

An electric power steering device includes a rack bar; a pinion shaft meshing with the rack bar; a worm wheel provided on the pinion shaft; a worm shaft meshing with the worm wheel; an electric motor provided on the worm shaft; a first housing accommodating at least a part of the rack bar and the pinion shaft and includes a first bolt boss formed with a through-hole; a second housing; and a bolt. The second housing includes a worm-wheel accommodating portion accommodating the worm wheel, and a second bolt boss provided to have a shorter distance to the first housing than that of the worm-wheel accommodating portion, and formed with a female-threaded portion. The second bolt boss is opposed to the first bolt boss to cause the female-threaded portion to be continuous with the through-hole of the first bolt boss. The bolt fastens the first housing to the second housing.

14 Claims, 6 Drawing Sheets

POWER STEERING DEVICE AND HOUSING FOR ELECTRIC POWER STEERING DEVICE

BACKGROUND OF THE INVENTION

The present invention relates to a power steering device and a housing for an electric power steering device.

Japanese Patent Application Publication No. 2001-173756 discloses this kind of technique. In this patent literature, a worm connected with a drive shaft of a motor meshes with a worm wheel which rotates integrally with an auxiliary pinion. A steerable road-wheel is steered by a rack shaft meshing with this auxiliary pinion. Thus, steering assisting force acts on a steering manipulation of driver.

SUMMARY OF THE INVENTION

In order to enhance the steering assisting force, it is conceivable that an output of the motor is increased. However, the output of the motor has an upper limit due to a limitation of supply power. Moreover, it is conceivable that the steering assisting force is enhanced by enlarging a diameter of the worm wheel so as to raise a speed reduction ratio. However, if the diameter of the worm wheel is simply enlarged, a radial size of a worm-gear case for accommodating the worm wheel is enlarged so that whole size of a housing is enlarged in the case as disclosed in the above patent literature.

It is an object of the present invention to provide a power steering device and a housing for an electric power steering device, devised to enhance steering assisting force while suppressing the enlargement of the housing.

According to one aspect of the present invention, there is provided an electric power steering device adapted to apply a steering force to a steerable road-wheel, the electric power steering device comprising: a rack bar configured to transmit a steering manipulation of a steering wheel to the steerable road-wheel; a pinion shaft meshing with the rack bar; a worm wheel provided on the pinion shaft; a worm shaft meshing with the worm wheel; an electric motor provided on the worm shaft and configured to generate the steering force to be applied to the steerable road-wheel; a first housing accommodating at least a part of the rack bar and at least a part of the pinion shaft, wherein the first housing includes a first bolt boss formed with a through-hole; a second housing including a worm-wheel accommodating portion accommodating the worm wheel, and a second bolt boss provided to have a shorter distance to the first housing than that of the worm-wheel accommodating portion, and formed with a female-threaded portion opened toward the first housing, wherein the second bolt boss is opposed to the first bolt boss to cause the female-threaded portion to be continuous with the through-hole of the first bolt boss; and a bolt inserted from the first bolt boss toward the second bolt boss and fastening the first housing to the second housing.

According to another aspect of the present invention, there is provided an electric power steering device adapted to apply a steering force to a steerable road-wheel, the electric power steering device comprising: a first pinion shaft configured to receive rotational force of a steering wheel; a rack bar including first rack teeth meshing with the first pinion shaft, and second rack teeth which is different from the first rack teeth; a second pinion shaft meshing with the second rack teeth; a worm wheel provided on the second pinion shaft; a worm shaft meshing with the worm wheel; an electric motor provided on the worm shaft and configured to generate the steering force to be applied to the steerable road-wheel; a first housing accommodating at least a part of the rack bar and at least a part of the second pinion shaft, wherein the first housing includes a first bolt boss formed with a through-hole; a second housing including a worm-wheel accommodating portion accommodating the worm wheel, and a second bolt boss located to have a shorter distance to the first housing than that of the worm-wheel accommodating portion, and formed with a female thread opened toward the first housing, wherein the second bolt boss is opposed to the first bolt boss to cause the female thread to be continuous with the through-hole of the first bolt boss; and a bolt inserted from the first bolt boss toward the second bolt boss and fastening the first housing to the second housing.

According to still another aspect of the present invention, there is provided a housing for an electric power steering device adapted to apply a steering force to a steerable road-wheel, the housing comprising: a first housing including a rack-bar accommodating portion accommodating at least a part of a rack bar configured to transmit a steering manipulation of a steering wheel to the steerable road-wheel, a pinion-shaft accommodating portion accommodating at least a part of a pinion shaft meshing with the rack bar, and a first bolt boss formed with a through-hole; a second housing including a worm-wheel accommodating portion accommodating a worm wheel provided on the pinion shaft and configured to transmit a steering force of an electric motor through the pinion shaft and the rack bar to the steerable road-wheel, and a second bolt boss provided to have a shorter distance to the first housing than that of the worm-wheel accommodating portion, and formed with a female thread opened toward the first housing, wherein the second bolt boss is opposed to the first bolt boss to cause the female thread to be continuous with the through-hole of the first bolt boss; and a bolt inserted from the first bolt boss toward the second bolt boss and fastening the first housing to the second housing.

The other objects and features of this invention will become understood from the following description with reference to the accompanying drawings.

DETAILED DESCRIPTION OF THE INVENTION

[First Embodiment]
(Entire Configuration)

Figure 1:
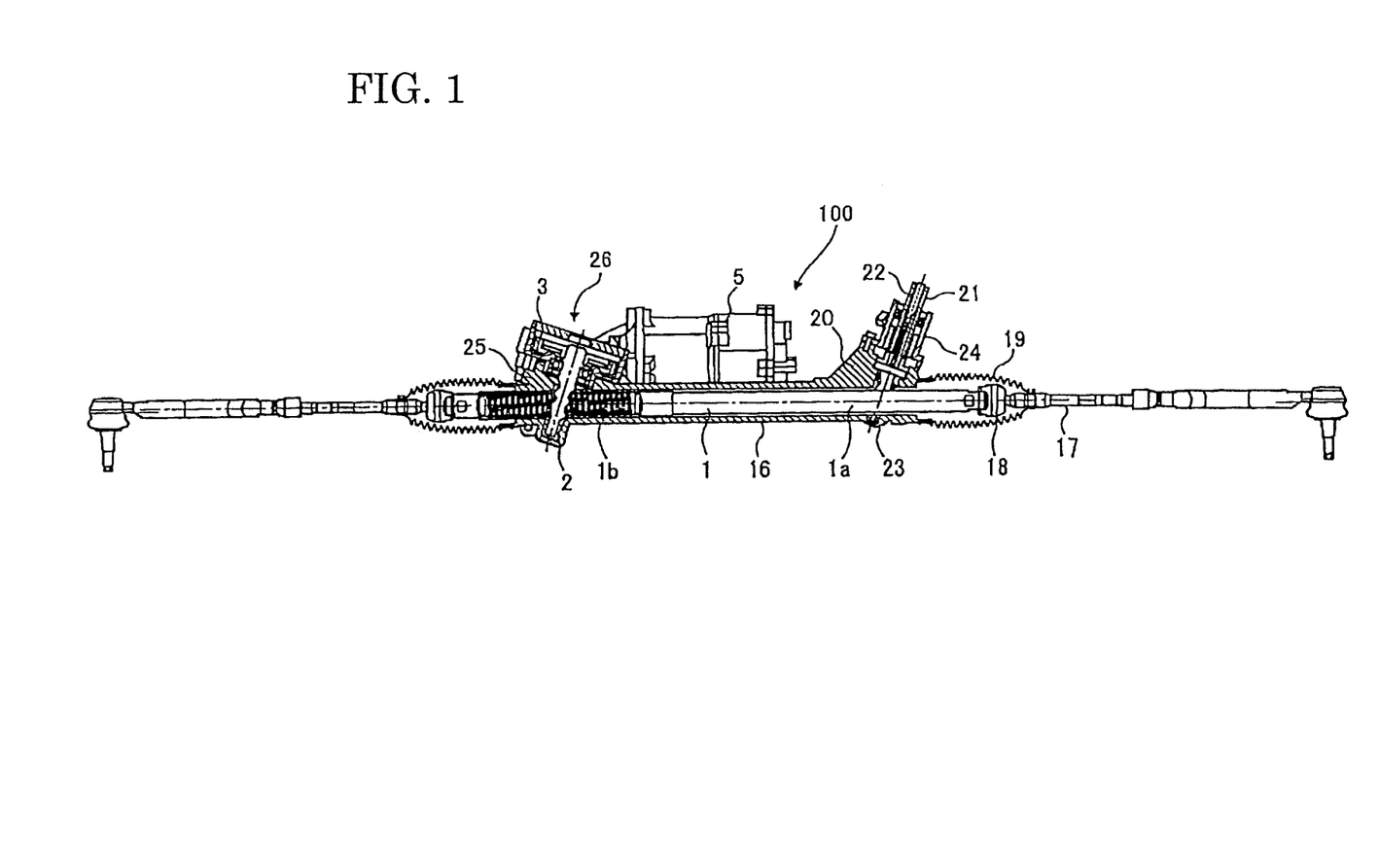
FIG. 1 is a view showing a schematic structure of an electric power steering device in a first embodiment according to the present invention.

FIG. 1 is a diagram illustrating an entire configuration of an electric power steering device 100 according to the present invention. As illustrated in FIG. 1, the electric power steering device 100 includes a rack housing 16 extending in a right-and-left direction (i.e., vehicle-width direction) of a vehicle. A rack bar 1 is received by and accommodated in the rack housing 16, to be able to slide on an inner surface of the rack housing 16 in the right-and-left direction of the vehicle. Both end portions of the rack bar 1 protrude respectively from both end-opening portions of the rack housing 16. A tie rod 17 is connected through a joint 18 with each of the end portions of the rack bar 1. The each end portion of the rack bar 1, the joint 18, and an end portion of the tie rod 17 which is near the joint 18 are covered by a boot 19. The tie rod 17 is moved by the movement of the rack bar 1, and thereby, a steerable road-wheel(s) is steered through a road-wheel turning mechanism connected with the tie rod 17.

A steering gear housing 20 is provided on one end side (i.e., right side in FIG. 1) of the rack housing 16. The steering gear housing 20 rotatably supports an input shaft 21 connected with a steering wheel. The input shaft 21 is connected through a torsion bar 22 with a first pinion shaft 23, to be able to rotate relative to the first pinion shaft 23. A torque sensor 24 is provided on an outer circumferential side of the input shaft 21. The torque sensor 24 detects a steering torque inputted by a driver into the steering wheel, from a relative rotation amount between the input shaft 21 and the first pinion shaft 23.

The first pinion shaft 23 meshes with a first rack teeth (gear) is formed in one end side of the rack bar 1. Thereby, a steering torque inputted into the steering wheel is transmitted to the rack bar 1. A reduction gear housing 25 is provided on another end side (i.e., left side in FIG. 1) of the rack housing 16. In the reduction gear housing 25, a power steering mechanism 26 is received or accommodated for giving an assisting steering torque to the steering torque inputted by the driver into the steering wheel.

[Configuration of Power Steering Mechanism]

The power steering mechanism 26 includes an electric motor 5, a worm shaft 4, a worm wheel 3 and a second pinion shaft 2. The worm shaft 4 is connected with an output shaft of the electric motor 5. The worm wheel 3 meshes with the worm shaft 4. The second pinion shaft 2 rotates integrally with the worm wheel 3. The second pinion shaft 2 meshes with a second rack teeth 1b formed in another end side of the rack bar 1. Thereby, motor torque inputted from the electric motor 5 is transmitted to the rack bar 1. The power steering mechanism 26 is constituted by a first housing 6 and a second housing 7 in which the second pinion shaft 2 and the like are mounted.

Figure 2:
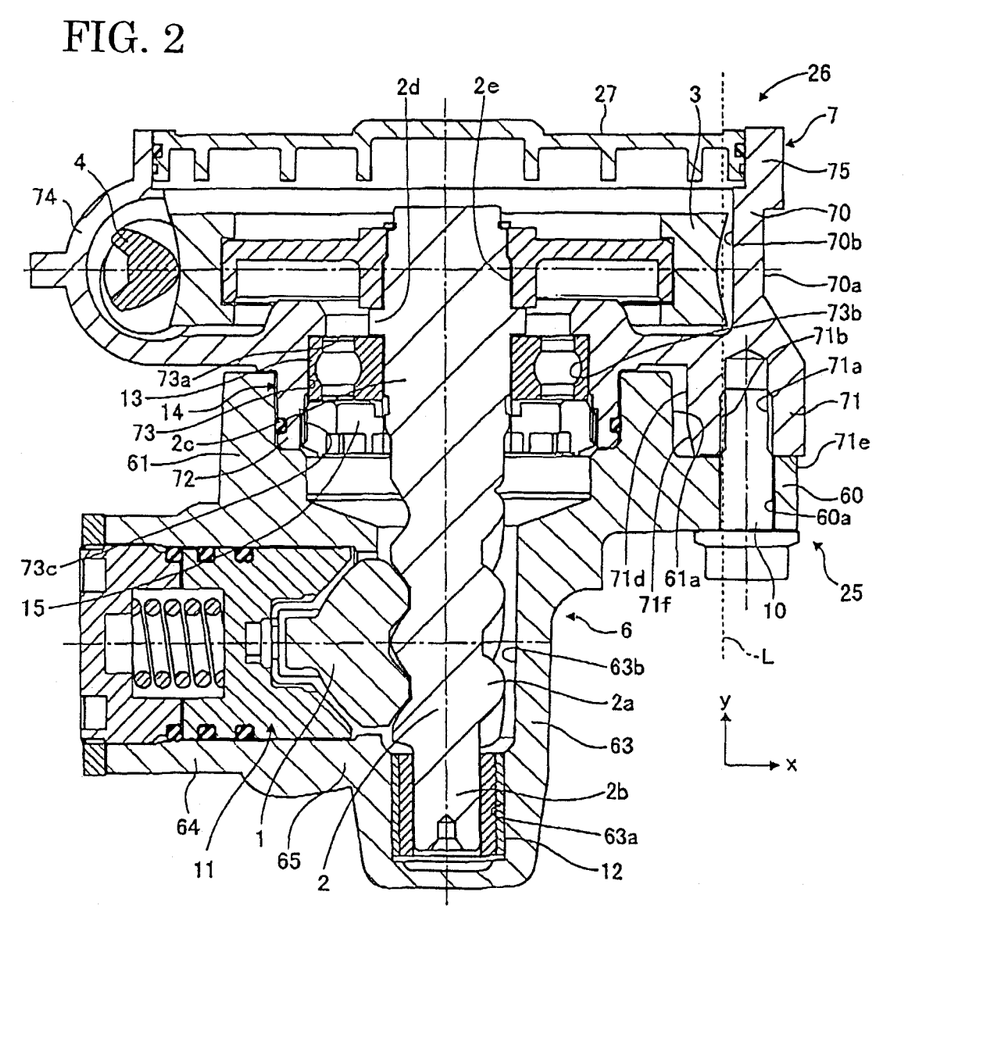
FIG. 2 is a cross-sectional view of a power steering mechanism in the first embodiment.
Figure 3:
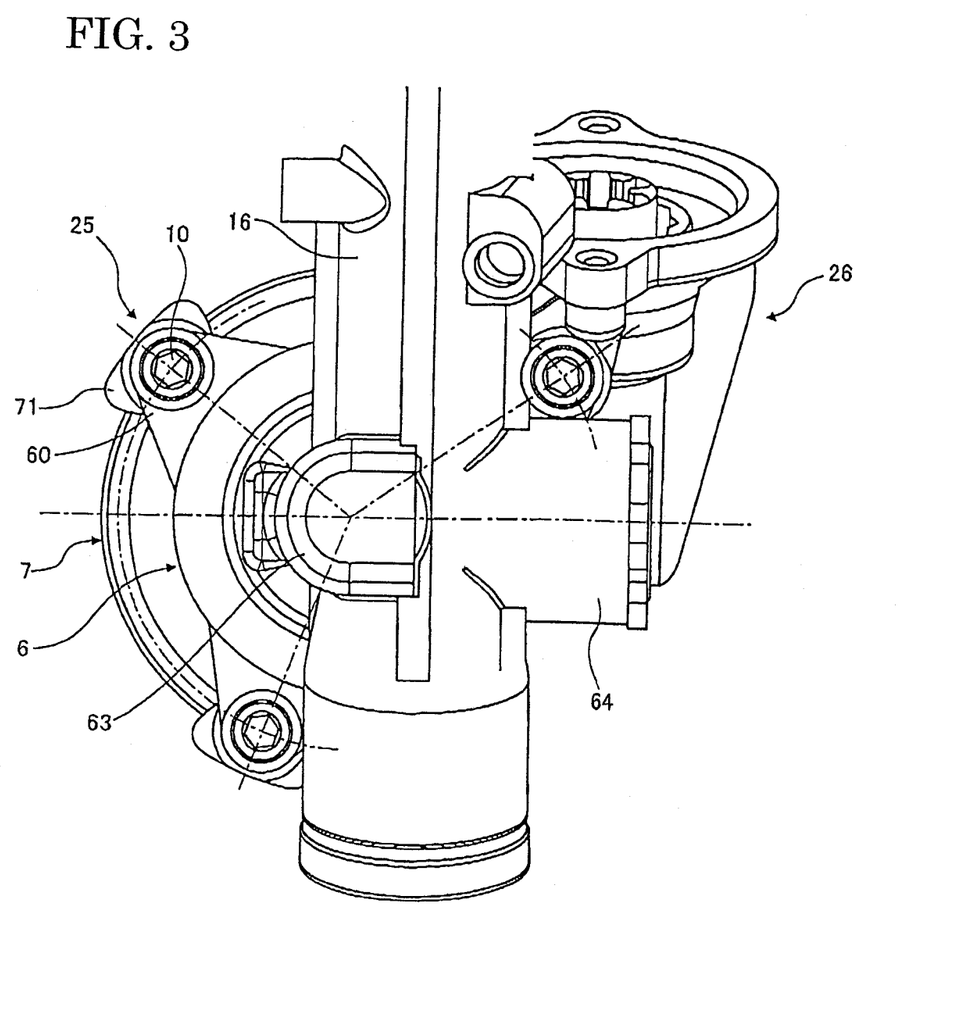
FIG. 3 is a view showing a reduction gear housing in the first embodiment.
Figure 4:
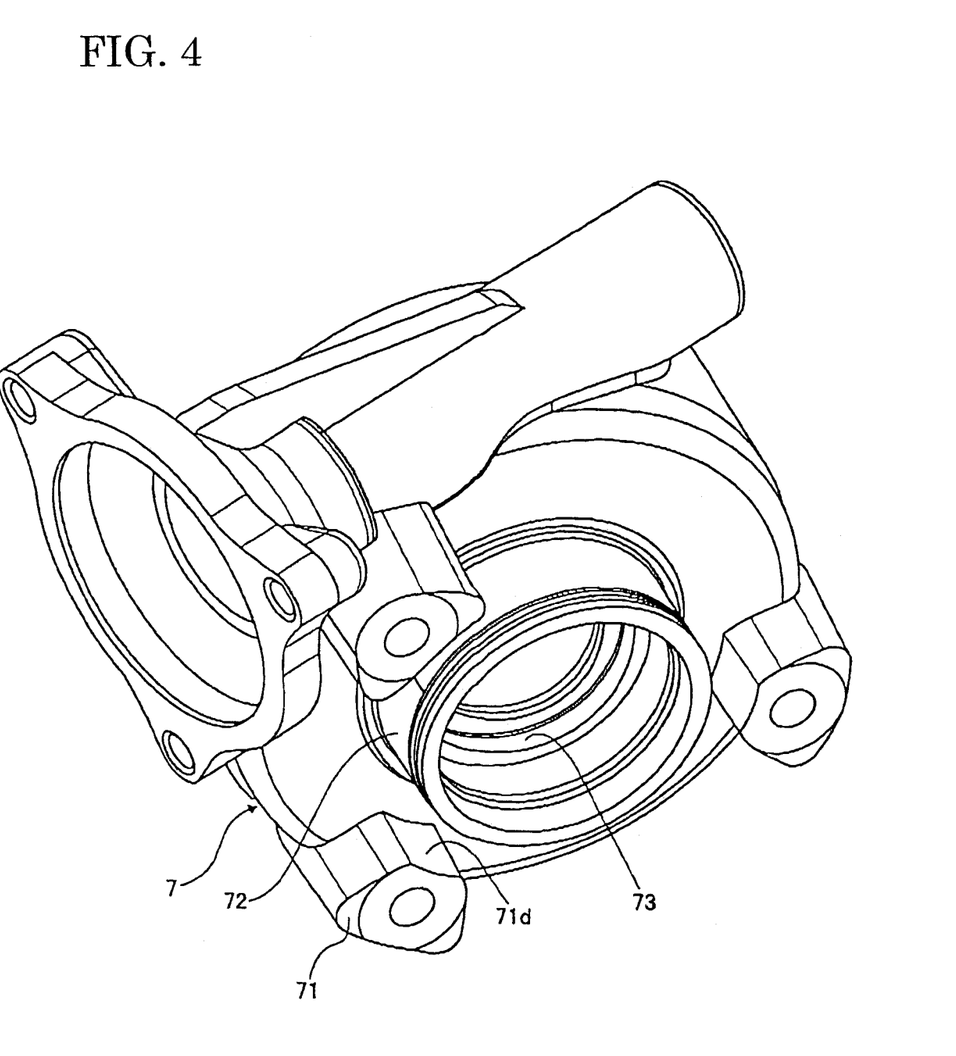
FIG. 4 is an oblique perspective view of a second housing in the first embodiment.

FIG. 2 is a cross-sectional view of the power steering mechanism 26, cut away by a plane having an axis of the second pinion shaft 2. FIG. 3 is a view of the reduction gear housing 25 as viewed in the axial direction from a distal end side (tip side) of the second pinion shaft 2. FIG. 4 is an oblique perspective view of the second housing 7. For convenience of explanation, an x-axis and a y-axis are set in FIG. 2. In FIG. 2, a direction in which a rack retainer 11 biases the rack bar 1 is defined as an x-axis direction. That is, a positive direction of the x-axis is a direction from the rack retainer 11 toward the second pinion shaft 2. Moreover, the axial direction of the second pinion shaft 2 is defined as a y-axis direction. A negative direction of the y-axis is a direction from the worm wheel 3 toward pinion teeth 2a.

(Configuration of Second Pinion Shaft)

The second pinion shaft 2 includes the pinion teeth (gear) 2a, a first-bearing insertion portion 2b, a second bearing press-fit portion 2c, a flange portion 2d and a worm-wheel fitting portion 2e. The pinion teeth 2a are formed in a y-axis-negative-directional portion of the second pinion shaft 2. The first-bearing insertion portion 2b having an outer diameter smaller than that of the pinion teeth 2a is formed at a distal end (tip) of the second pinion shaft 2 in the negative direction of y-axis. The second bearing press-fit portion 2c having an outer diameter larger than that of the pinion teeth 2a is formed at a location beyond the pinion teeth 2a of the second pinion shaft 2 in the positive direction of y-axis. The flange portion 2d having an outer diameter larger than that of the second bearing press-fit portion 2c is formed at a location beyond the second bearing press-fit portion 2c of the second pinion shaft 2 in the positive direction of y-axis. The worm-wheel fitting portion 2e having an outer diameter smaller than that of the flange portion 2d is formed at a location beyond the flange portion 2d of the second pinion shaft 2 in the positive direction of y-axis.

(Configuration of Second Housing)

The second housing 7 is formed in a hollow shape. A worm-wheel accommodating portion 70 is formed in the vicinity of a center of the second housing 7 with respect to the y-axis direction. An inner diameter of the worm-wheel accommodating portion 70 is larger than an outer diameter of the worm wheel 3. A worm-shaft accommodating portion 74 is formed to extend perpendicularly to the axial direction of the worm-wheel accommodating portion 70. An inner diameter of the worm-shaft accommodating portion 74 (having a substantially circular shape in cross section cut by x-y plane) is larger than an outer diameter of the worm shaft 4.

A lid-member fitting portion 75 is formed at a portion of the second housing 7 which is located beyond the worm-wheel accommodating portion 70 in the positive direction of y-axis. The lid-member fitting portion 75 is formed to have inner and outer diameters respectively larger than those of the worm-wheel accommodating portion 70. A second-bearing holding portion 73 is formed at a portion of the second housing 7 which is located beyond the worm-wheel accommodating portion 70 in the negative direction of y-axis. A second bearing 13 which will be described later is installed in second-bearing holding portion 73. That is, the second bearing 13 is provided at a location close to the worm wheel 3. An opening portion of the second-bearing holding portion 73 on the side of the worm-wheel accommodating portion 70 is formed to have an inner diameter approximately equal to an inner diameter of an outer race of the second bearing 13. The opening portion of the second-bearing holding portion 73 includes a second-bearing holding-portion bottom surface 73a which is located on the y-axis-negative-directional side of the opening portion and which is perpendicular to y-axis. An inner circumferential surface of the second-bearing holding portion 73 is surface-treated by machine work and constitutes a second-bearing holding-portion inner circumferential surface 73b. The second-bearing holding portion 73 includes a locking-ring fitting portion 73c formed at a y-axis-negative portion (i.e., formed in an axially negative side) of the second-bearing holding portion 73. Most of the second-bearing holding portion 73 is formed in an inner circumferential side of a portion protruding in the y-axis negative direction with respect to the worm-wheel accommodating portion 70. That is, an inner circumferential portion of a portion protruding from the worm-wheel accommodating portion 70 in the y-axis negative direction constitutes a majority of the second-bearing holding portion 73. An outer circumferential portion of this protruding portion constitutes a second cylindrical engaging portion 72. The second cylindrical engaging portion 72 is formed so as to protrude toward the side of the first housing 6. That is, the second housing 7 includes a tubular portion constituted by the second cylindrical engaging portion 72 and the second-bearing holding portion 73.

Radially outside the second-bearing holding portion 73, second bolt bosses 71 are formed at three spots of the second housing 7 along the circumferential direction of the second housing 7 so as to surround the second-bearing holding portion 73. Each of the three second bolt bosses 71 is formed to independently protrude in the negative direction of y-axis. That is, the three second bolt bosses 71 protrude toward the side of the first housing 6 in a separated manner from one another, as shown in FIG. 4. Each of the second bolt bosses 71 is formed with a female-threaded portion 71*a* which opens in the negative direction of y-axis. A deepest portion of each female-threaded portion 71*a* is located beyond the worm-wheel accommodating portion 70 with respect to the negative direction of y-axis. Moreover, a female-thread innermost portion 71*b* located in an innermost side (with respect to the radial direction of the worm-wheel accommodating portion 70) of an inner circumferential surface of the female-threaded portion 71*a*, i.e., a site indicated by a dotted line L in FIG. 2 is located beyond an inner circumferential surface 70*b* of the worm-wheel accommodating portion 70 of the second housing 7 in the radially-inner direction of the worm-wheel accommodating portion 70. That is, the innermost portion of the female-threaded portion 71*a* with respect to the radial direction of the second pinion shaft 2 has a shorter distance to the axis of the second pinion shaft 2 than a distance between the axis of the second pinion shaft 2 and the inner circumferential surface 70*b* of the worm-wheel accommodating portion 70. In other words, the female-thread innermost portion 71*b* of the female-threaded portion 71*a* (the site indicated by the dotted line L in FIG. 2) is formed to be located inside beyond an outer circumferential surface 70*a* of the worm-wheel accommodating portion 70 of the second housing 7 with respect to the radial direction of the worm-wheel accommodating portion 70.

An inner side-surface 71*d* (with respect to the radial direction of the second pinion shaft 2) of the second bolt boss 71 is formed in a shape conforming to a curved surface of an outer side-surface 61*a* (with respect to the radial direction of the second pinion shaft 2) of an after-mentioned first cylindrical engaging portion 61, as shown in FIG. 4. That is, the radially-inner side-surface 71*d* (with respect to the radial direction of the second pinion shaft 2) of the second bolt boss 71 is formed in a curved-surface shape having its center same as a center of the curve of the outer side-surface 61*a* (with respect to the radial direction of the second pinion shaft 2) of the first cylindrical engaging portion 61. Moreover, the radially-inner side-surface 71*d* includes a tapered portion 71*f* formed diagonally in the radially-outer direction of the second pinion shaft 2. That is, over a range of the tapered portion 71*f*, a diameter of the curve of the radially-inner side-surface 71*d* which sets the axis of the second pinion shaft 2 as its center becomes larger toward the negative direction of y-axis. In other words, the tapered portion 71*f* is formed such that any one portion (i.e., one cross-section perpendicular to the axial direction) of the tapered portion 71*f* has a curvature radius smaller than that of another portion (i.e., another cross-section perpendicular to the axial direction) of the tapered portion 71*f* which is located beyond the any one portion of the tapered portion 71*f* with respect to the negative direction of y-axis. Also, a y-axis-negative-side end surface of the second bolt boss 71, i.e., an opposed surface 71*e* of the second bolt boss 71 which is opposed to an after-mentioned first bolt boss 60 of the first housing 6 is formed in parallel with the second-bearing holding-portion bottom surface 73*a* of the second-bearing holding portion 73.

(Configuration of First Housing)

The first housing 6 includes a hollow pinion-shaft accommodating portion 63 formed in a bottomed-cup shape. The hollow pinion-shaft accommodating portion 63 is formed with an opening portion on its y-axis positive side, and is formed with a bottom on its y-axis negative side. The first housing 6 includes a first-bearing holding portion 63*a* formed at a bottom portion of the pinion-shaft accommodating portion 63. A pinion-teeth accommodating portion 63*b* having a (inner) diameter larger than that of the first-bearing holding portion 63*a* is formed at a location beyond the first-bearing holding portion 63*a* in the positive direction of y-axis. This pinion-teeth accommodating portion 63*b* of the first housing 6 is formed to have the inner diameter larger than an outer diameter of the pinion teeth 2*a*. On an x-axis negative side of the pinion-shaft accommodating portion 63, the first housing 6 includes a rack-bar accommodating portion 65 formed to extend in a twisted direction with respect to the axial direction of the pinion-shaft accommodating portion 63, as shown in FIGS. 1 and 2. The pinion-shaft accommodating portion 63 communicates with (i.e., open to) the rack-bar accommodating portion 65 in the vicinity of a location where the axial direction (i.e., axis) of the pinion-shaft accommodating portion 63 intersects with the axial direction (i.e., axis) of the rack-bar accommodating portion 65 when seen from the x-axis positive direction.

The first bolt boss 60 is formed at a location beyond the pinion-teeth accommodating portion 63*b* in the positive direction of y-axis (i.e., is located closer to the y-axis positive side than the pinion-teeth accommodating portion 63*b*). Also, the first bolt boss 60 is located radially outside the pinion-teeth accommodating portion 63*b* with respect to the radial direction of the second pinion shaft 2 (i.e., is located on the outer circumferential side of the pinion-teeth accommodating portion 63*b*). In this embodiment, three first bolt bosses 60 are formed at three spots arranged in a circumferential direction around the axis of the pinion-shaft accommodating portion 63. Each of the three first bolt bosses 60 faces (is opposed to) the second bolt boss 71. One of the three first bolt bosses 60 is located between the rack-bar accommodating portion 65 and a retainer accommodating portion 64 as shown in FIG. 3.

The first cylindrical engaging portion 61 is formed at a location beyond the pinion-shaft accommodating portion 63 in the positive direction of y-axis (i.e., is located closer to the y-axis-positive directional side than the pinion-shaft accommodating portion 63). That is, the first cylindrical engaging portion 61 is formed to protrude toward the side of the second housing 7. The first cylindrical engaging portion 61 is formed in an annular shape (tubular shape) protruding from the pinion-shaft accommodating portion 63. An inner diameter of the annular-shaped first cylindrical engaging portion 61 is slightly larger than an outer diameter of the second cylindrical engaging portion 72. An outer diameter of the annular-shaped first cylindrical engaging portion 61 is smaller than a diameter of an imaginary circle given by connecting the radially-inner side-surfaces 71*d* of the three second bolt bosses 71 with one another.

(Assembling to Motor Gear Housing)

The second bearing 13 is inserted into the second-bearing holding portion 73 from the y-axis-negative side of the second housing 7. At this time, an outer race of the second bearing 13 is brought into contact with the second-bearing holding-portion bottom surface 73*a*. A locking ring 15 is fitted in the locking-ring fitting portion 73*c*. The locking ring 15 is brought into contact with the outer race of the second bearing 13 in a fitted state, so that the second bearing 13 is sandwiched and supported between the second-bearing holding-portion bottom surface 73*a* and the locking ring 15. The worm wheel 3 includes a through-hole formed at a center of the worm wheel 3. Into this through-hole, the worm-wheel fitting portion 2*e* of the second pinion shaft 2 is press-fitted. Under a state where the worm wheel 3 has been attached to the second pinion shaft 2, the second pinion shaft 2 is inserted into the second bearing 13 attached to the second housing 7, from a y-axis-positive-directional distal end of the second bearing 13. Thereby, the worm wheel 3 is accommodated and mounted in the worm-wheel accommodating portion 70 of the second housing 7 under a state where a flange portion 2*d* of the second pinion shaft 2 is in contact with an inner race of the second bearing 13. Moreover, the worm shaft 4 is inserted into the worm-shaft accommodating portion 74 of the second housing 7 and is meshed with the worm wheel 3. A lid member 27 is fitted in the lid-member fitting portion 75 so as to close an opening of a y-axis-positive-directional portion of the second housing 7.

A first bearing 12 is fitted into the first-bearing holding portion 63*a* by press fitting, from the y-axis-positive side of the first housing 6. Under a state where the second pinion shaft 2 has been attached to the second housing 7, the second pinion shaft 2 is inserted into the pinion-shaft accommodating portion 63 of the first housing 6. At this time, an outer circumferential surface of the second cylindrical engaging portion 72 of the second housing 7 is fitted into an inner circumferential surface of the first cylindrical engaging portion 61 of the first housing 6. The first cylindrical engaging portion 61 cooperates with the second cylindrical engaging portion 72 to define a spigot-and-socket connection portion (convex-concave connection portion) 14. This spigot-and-socket connection portion 14 is positioned to overlap with the female-threaded portion 71*a* of the second bolt boss 71 along the y-axis direction (i.e., as viewed from the x-axis direction). When the first-bearing insertion portion 2*b* of the second pinion shaft 2 is inserted into the first bearing 12, the pinion teeth 2*a* are accommodated in the pinion-teeth accommodating portion 63*b*. Then, the rack bar 1 is accommodated in the rack-bar accommodating portion 65 of the first housing 6, and is meshed with the pinion teeth 2*a*. The rack retainer 11 is accommodated and received in the retainer accommodating portion 64. The rack bar 1 is pressed onto the second pinion shaft 2 by the rack retainer 11. Because each first bolt boss 60 has a through-hole 60*a* formed to be continuous with the female-threaded portion 71*a* of the second bolt boss 71, a bolt 10 is inserted into the through-hole 60*a* of each first bolt boss 60 and is screwed in the female-threaded portion 71*a* of the second housing 7. As a result, the first housing 6 is combined and fastened with the second housing 7.

[Operations]

The electric power steering device 100 applies a steering assisting force to a steering manipulation of a driver by causing torque of the electric motor 5 to act on the rack bar 1. In order to increase the steering assisting force, it is generally conceivable that the output of the electric motor 5 is increased. However, the output of the electric motor 5 has an upper limit due to a limitation of supply power. Moreover, it is conceivable that the steering assisting force is increased by enlarging the diameter of the worm wheel 3 so as to raise the speed reduction ratio. However, if the diameter of the worm wheel 3 is simply enlarged, a size of the reduction gear housing 25 is enlarged. Therefore, in the electric power steering device 100 according to the first embodiment, each second bolt boss 71 is provided on the side of the first housing 6 rather than the worm-wheel accommodating portion 70 of the second housing 7. That is, the second bolt boss 71 is located beyond the worm-wheel accommodating portion 70, in a direction from the second housing 7 toward the first housing 6 (i.e., with respect to the negative direction of y-axis). In other words, the second bolt boss 71 has a shorter distance to (a center of) the first housing 6 than that of the worm-wheel accommodating portion 70. Accordingly, each second bolt boss 71 can be formed to overlap with the worm-wheel accommodating portion 70 along the radial direction of the worm-wheel accommodating portion 70 (i.e., as viewed from the axial direction of the worm-wheel accommodating portion 70).

In the electric power steering device 100 according to the first embodiment, the female-threaded portion 71*a* is formed such that the female-thread innermost portion 71*b* which is a radially-innermost portion (i.e., a portion closest to the axis of the second pinion shaft 2) of the inner circumferential surface of the female-threaded portion 71*a* is located more inwardly than the outer circumferential surface 70*a* of the worm-wheel accommodating portion 70 of the second housing 7 with respect to the radial direction of the second pinion shaft 2. That is, the axis of the second pinion shaft 2 is closer to the female-thread innermost portion 71*b* of the female-threaded portion 71*a* than the outer circumferential surface 70*a* of the worm-wheel accommodating portion 70. Accordingly, each second bolt boss 71 can be positioned more inwardly with respect to the radial direction of the worm-wheel accommodating portion 70.

Moreover, in the electric power steering device 100 according to the first embodiment, the female-threaded portion 71*a* is formed such that the female-thread innermost portion 71*b* is located more inwardly than the inner circumferential surface 70*b* of the worm-wheel accommodating portion 70 of the second housing 7 with respect to the radial direction of the second pinion shaft 2. That is, the axis of the second pinion shaft 2 is closer to the female-thread innermost portion 71*b* than the inner circumferential surface 70*b* of the worm-wheel accommodating portion 70. Accordingly, each second bolt boss 71 can be positioned more inwardly with respect to the radial direction of the worm-wheel accommodating portion 70.

Moreover, in the electric power steering device 100 according to the first embodiment, the first housing 6 is formed to protrude toward the second housing 7. This first housing 6 includes the first cylindrical engaging portion 61 which is formed in a cylindrical shape (tubular shape) and inside which the second pinion shaft 2 is received. Moreover, the second housing 7 is formed to protrude toward the first housing 6. This second housing 7 includes the second cylindrical engaging portion 72 which is formed in a cylindrical shape (tubular shape) and inside which the second pinion shaft 2 is received. The second cylindrical engaging portion 72 and the first cylindrical engaging portion 61 are engaged with and fastened to each other. Moreover, the plurality of second bolt bosses 71 are arrayed along the circumferential direction (i.e., arrayed at a plurality of circumferential spots) of the second housing 7, and each of the plurality of second bolt bosses 71 is formed to protrude toward the first housing 6 independently (separately) with respect to the circumferential direction of the second housing 7. Accordingly, a positioning accuracy in the radial direction between the first housing 6 and the second housing 7 can be improved by means of the engagement between the first cylindrical engaging portion 61 and the second cylindrical engaging portion 72. Moreover, a weight reduction of the electric power steering device 100 can be realized because no wall (no part of the second housing 7) exists between any adjacent two of the plurality of second bolt bosses 71.

Moreover, in the electric power steering device 100 according to the first embodiment, one of the plurality of first bolt bosses 60 is provided between the rack-bar accommodating portion 65 and the retainer accommodating portion 64 with respect to the circumferential direction of the second pinion shaft 2. Accordingly, the first bolt bosses 60 can be arranged with a good balance in the circumferential direction while avoiding the locations of the rack-bar accommodating portion 65 and the retainer accommodating portion 64.

Moreover, in the electric power steering device 100 according to the first embodiment, the second cylindrical engaging portion 72 is engaged and combined with the first cylindrical engaging portion 61 by being inserted into the first cylindrical engaging portion 61. With respect to the radial direction of the second pinion shaft 2 (regarded as a reference center axis), the radially inner side-surface 71*d* of each of the plurality of second bolt bosses 71 is formed in a shape conforming to (i.e., matching with) the shape of the radially outer side-surface 61*a* of the first cylindrical engaging portion 61. Accordingly, the inner side-surface 71*d* of each second bolt boss 71 can be used as a guide when the first housing 6 and the second housing 7 are engaged with each other.

Moreover, in the electric power steering device 100 according to the first embodiment, the tapered portion 71*f* which is formed such that a diameter of the tapered portion 71*f* is gradually enlarged toward the first bolt boss 60 is provided in the inner side-surface 71*d* of the second bolt boss 71. Accordingly, the first cylindrical engaging portion 61 can be easily inserted into a space provided between the second cylindrical engaging portion 72 and the second bolt boss 71.

Moreover, in the electric power steering device 100 according to the first embodiment, the first bearing 12 rotatably supporting the second pinion shaft 2 is provided in the first housing 6. The second-bearing holding portion 73 for holding the second bearing 13 rotatably supporting the second pinion shaft 2 is provided to the second housing 7. The worm wheel 3 is closer to the location of the second-bearing holding portion 73 than the location of the first bearing 12. Accordingly, the positioning accuracy of the worm wheel 3 can be improved with respect to the second housing 7.

Moreover, in the electric power steering device 100 according to the first embodiment, the second cylindrical engaging portion 72 is engaged with the first cylindrical engaging portion 61 by being inserted into the first cylindrical engaging portion 61. Accordingly, the first cylindrical engaging portion 61 is arranged outside the second cylindrical engaging portion 72 in the radial direction of the second pinion shaft 2 while the second bearing 13 is arranged on the inner circumferential side of the second cylindrical engaging portion 72. Hence, the second bearing 13 and the first cylindrical engaging portion 61 can be arranged to overlap with each other.

Moreover, in the electric power steering device 100 according to the first embodiment, the spigot-and-socket connection portion (convex-concave connection portion) 14 is constituted by the first cylindrical engaging portion 61 and the second cylindrical engaging portion 72. Accordingly, the positioning accuracy between the first housing 6 and the second housing 7 can be enhanced in the radial direction.

Moreover, in the electric power steering device 100 according to the first embodiment, the spigot-and-socket connection portion (convex-concave connection portion) 14 and the female-threaded portion 71*a* are arranged to overlap with each other along the axial direction of the second pinion shaft 2 (as viewed from the radial direction of the second pinion shaft 2). Accordingly, axial dimensions of the first housing 6 and the second housing 7 can be reduced.

Moreover, in the electric power steering device 100 according to the first embodiment, the second-bearing holding-portion bottom surface 73*a* of the second-bearing holding portion 73 which is in contact with an axial end surface of the second bearing 13 is formed parallel to the opposed surface 71*e* of the second bolt boss 71 which is opposed to (i.e., faces) the first bolt boss 60. Accordingly, the second-bearing holding-portion bottom surface 73*a* and the opposed surface 71*e* can be shape-formed by machine work with the same chucking from the same direction.

Moreover, in the electric power steering device 100 according to the first embodiment, a surface-treatment by machine work is applied to the second-bearing holding-portion inner circumferential surface 73*b* of the second-bearing holding portion 73 which is in contact with an outer circumferential surface of the second bearing 13. Accordingly, the positioning accuracy in the radial direction of the second bearing 13 with respect to the second housing 7 can be improved.

Moreover, in the electric power steering device 100 according to the first embodiment, the female-threaded portion 71*a* is formed such that the first housing 6 is closer to a worm-wheel-side end portion (i.e., a y-axis-positive-directional end portion) of the female-threaded portion 71*a* than a first-housing-side end portion (i.e., a y-axis-negative-directional end portion) of the worm-wheel accommodating portion 70. That is, the y-axis-positive-directional end portion of the female-threaded portion 71*a* is located in the negative direction of y-axis beyond the y-axis-negative-directional end portion of the worm-wheel accommodating portion 70, as shown in FIG. 2. Accordingly, the second bolt boss 71 can be formed at a location more inside in the radial direction of the second pinion shaft 2 than the worm-wheel accommodating portion (i.e., worm-wheel accommodating wall) 70.

[Effects]

Some technical structures obtainable from the above first embodiment according to the present invention will now be listed with their advantageous effects.

[a] An electric power steering device (100) adapted to apply a steering force to a steerable road-wheel, the electric power steering device comprising: a rack bar (1) configured to transmit a steering manipulation of a steering wheel to the steerable road-wheel; a second pinion shaft (2) meshing with the rack bar (1); a worm wheel (3) provided on the second pinion shaft (2); a worm shaft (4) meshing with the worm wheel (3); an electric motor (5) provided on the worm shaft (4) and configured to generate the steering force to be applied to the steerable road-wheel; a first housing (6) accommodating at least a part of the rack bar (1) and at least a part of the second pinion shaft (2), wherein the first housing (6) includes a first bolt boss (60) formed with a through-hole (60*a*); a second housing (7) including a worm-wheel accommodating portion (70) accommodating the worm wheel (3), and a second bolt boss (71) provided to have a shorter distance to the first housing (6) than that of the worm-wheel accommodating portion (70), and formed with a female-threaded portion (71*a*) opened toward the first housing (6), wherein the second bolt boss (71) is opposed to the first bolt boss (60) to cause the female-threaded portion (71*a*) to be continuous with the through-hole (60*a*) of the first bolt boss (60); and a bolt (10) inserted from the first bolt boss (60) toward the second bolt boss (71) and fastening the first housing (6) to the second housing (7). Accordingly, the second bolt boss (71) can be formed to overlap with the worm-wheel accommodating portion (70) along the radial direction of the worm-wheel accommodating portion (70), i.e., as viewed from the axial direction of the worm-wheel accommodating portion (70). The radial dimensions of the first housing (6) and the second housing (7) can be decreased, resulting in a downsizing of the electric power steering device (100).

[b] The female-threaded portion (71*a*) is formed such that a radially-innermost portion (71*b*) of an inner circumferential surface of the female-threaded portion (71*a*) with respect to a radial direction of the second pinion shaft (2) is located more inwardly with respect to the radial direction of the second pinion shaft (2) than an outer circumferential surface (70a) of the worm-wheel accommodating portion (70) of the second housing (7). Accordingly, the second bolt boss (71) can be positioned more inwardly with respect to the radial direction of the worm-wheel accommodating portion (70). Hence, the radial dimensions of the first housing (6) and the second housing (7) can be reduced, so that the electric power steering device (100) can be downsized.

[c] The female-threaded portion (71a) is formed such that the radially-innermost portion (71b) of the female-threaded portion (71a) is located more inwardly with respect to the radial direction of the second pinion shaft (2) than an inner circumferential surface (70b) of the worm-wheel accommodating portion (70) of the second housing (7). Accordingly, the second bolt boss (71) can be positioned more inwardly with respect to the radial direction of the worm-wheel accommodating portion (70). Hence, the radial dimensions of the first housing (6) and the second housing (7) can be reduced, so that the electric power steering device (100) can be downsized.

[d] The first housing (6) is formed to protrude toward the second housing (7); the first housing (6) further includes a first cylindrical engaging portion (61) inside which the second pinion shaft (2) is accommodated; the second housing (7) is formed to protrude toward the first housing (6); the second housing (7) includes a second cylindrical engaging portion (72) inside which the second pinion shaft (2) is accommodated; the second cylindrical engaging portion (72) is engaged with the first cylindrical engaging portion (61); the plurality of second bolt bosses (71) are arrayed along a circumferential direction of the second housing (7); and the plurality of second bolt bosses (71) protrude toward the first housing (6) independently from one another with respect to the circumferential direction of the second housing (7). Accordingly, a positioning accuracy in the radial direction between the first housing (6) and the second housing (7) can be improved because of the engagement between the first cylindrical engaging portion (61) and the second cylindrical engaging portion (72). Moreover, a weight reduction of the electric power steering device 100 can be attained because no member (no part of the second housing 7) exists between any adjacent two of the plurality of second bolt bosses (71).

[e] The first housing (6) further includes a rack-bar accommodating portion (65) accommodating the rack bar (1), a pinion-shaft accommodating portion (63) accommodating the second pinion shaft (2), and a retainer accommodating portion (64) accommodating a rack retainer (11) biasing the rack bar (1) toward the second pinion shaft (2). One of a plurality of first bolt bosses (60) provided opposed to the plurality of second bolt bosses (71) is located between the rack-bar accommodating portion (65) and the retainer accommodating portion (64) with respect to the circumferential direction of the second pinion shaft (2). Accordingly, the first bolt bosses (60) can be arranged with a good balance in the circumferential direction while avoiding the locations of the rack-bar accommodating portion (65) and the retainer accommodating portion (64). Therefore, a fastening force between the first housing (6) and the second housing (7) can be applied equally in the circumferential direction, so that a rattling (looseness) between the first housing (6) and the second housing (7) can be suppressed.

[f] The second cylindrical engaging portion (72) is engaged with the first cylindrical engaging portion (61) by being inserted into the first cylindrical engaging portion (61). A radially inner side-surface (71d) of each of the plurality of second bolt bosses (71) with respect to a radial direction of the second pinion shaft (2) is formed in a shape conforming to a shape of a radially outer side-surface (61a) of the first cylindrical engaging portion (61). Accordingly, the inner side-surface (71d) of each second bolt boss (71) can be used as a guide when the first housing (6) and the second housing (7) are engaged with each other. Hence, an assembling performance between the first housing (6) and the second housing (7) can be improved.

[g] The radially inner side-surface (71d) of the second bolt boss (71) includes a tapered portion (71f) whose curvature radius about an axis of the second pinion shaft (2) becomes larger toward the first bolt boss (60). Accordingly, the first cylindrical engaging portion (61) can be easily inserted into a space provided between the second cylindrical engaging portion (72) and the second bolt boss (71). Hence, the assembling performance between the first housing (6) and the second housing (7) can be improved.

[h] The first housing (6) is equipped with a first bearing (12) that rotatably supports the second pinion shaft (2); the second housing (7) includes a second-bearing holding portion (73) holding a second bearing (13) that rotatably supports the second pinion shaft (2); and the second bearing (13) is located between the first bearing (12) and the worm wheel (3). Accordingly, the positioning accuracy of the worm wheel (3) can be improved with respect to the second housing (7). Hence, an accuracy in relative position between the worm wheel (3) and the worm shaft (4), i.e., a meshing accuracy between the worm wheel (3) and the worm shaft (4) can be improved so that a power-transmission efficiency from the worm shaft (4) to the worm wheel (3) can be enhanced.

[i] The second cylindrical engaging portion (72) is fixedly engaged with the first cylindrical engaging portion (61) by being inserted into the first cylindrical engaging portion (61). Accordingly, the first cylindrical engaging portion (61) is arranged radially outside the second cylindrical engaging portion (72) while the second bearing (13) is arranged on the inner circumferential side of the second cylindrical engaging portion (72). Hence, the second bearing (13) and the first cylindrical engaging portion (61) can be provided to overlap with each other. Therefore, the axial dimensions of the first housing (6) and the second housing (7) can be decreased so that the electric power steering device (100) can be downsized.

[j] The first cylindrical engaging portion (61) cooperates with the second cylindrical engaging portion (72) to form a spigot-and-socket connection portion (14). Accordingly, the positioning accuracy between the first housing (6) and the second housing (7) can be enhanced in the radial direction of the second pinion shaft (2).

[k] The spigot-and-socket connection portion (14) is located to overlap with the female-threaded portion (71a) along the axial direction of the second pinion shaft (2). Accordingly, the axial sizes of the first housing (6) and the second housing (7) can be reduced to downsize the electric power steering device (100).

[l] An opposed surface (71e) of the second bolt boss (71) which is opposed to the first bolt boss (60) is parallel to a second-bearing holding-portion bottom surface (73a) of the second-bearing holding portion (73) which is in contact with an axial end surface of the second bearing (13). Accordingly, the second-bearing holding-portion bottom surface (73a) and the opposed surface (71e) can be shape-formed by machine work with the same chucking from the same direction. Hence, a forming workability can be improved.

[m] A surface-treatment by machine work is applied to a second-bearing holding-portion inner circumferential surface (73b) of the second-bearing holding portion (73) which is in contact with an outer circumferential surface of the second bearing (13). Accordingly, the positioning accuracy in the radial direction of the second bearing (13) with respect to the second housing (7) can be improved. Hence, an accuracy of relative position between the worm wheel (3) and the worm shaft (4), i.e., a meshing accuracy between the worm wheel (3) and the worm shaft (4) can be improved so that the power-transmission efficiency from the worm shaft (4) to the worm wheel (3) can be enhanced.

[n] The first housing (6) is closer to a worm-wheel-side end portion of the female-threaded portion (71a) than a first-housing-side end portion of the worm-wheel accommodating portion (70). Accordingly, the second bolt boss (71) can be formed at a location more inside with respect to the radial direction of the second pinion shaft (2) than the worm-wheel accommodating portion (i.e., worm-wheel accommodating wall) 70. Hence, the radial dimensions of the first housing (6) and the second housing (7) can be reduced so that the electric power steering device (100) can be downsized.

[Second Embodiment]

An electric power steering device 100 in a second embodiment according to the present invention will now be explained. Same reference signs are given to same structures as those in the electric power steering device 100 of the first embodiment, and explanations thereof will be omitted.

[Configuration of Power Steering Mechanism]

Figure 5:
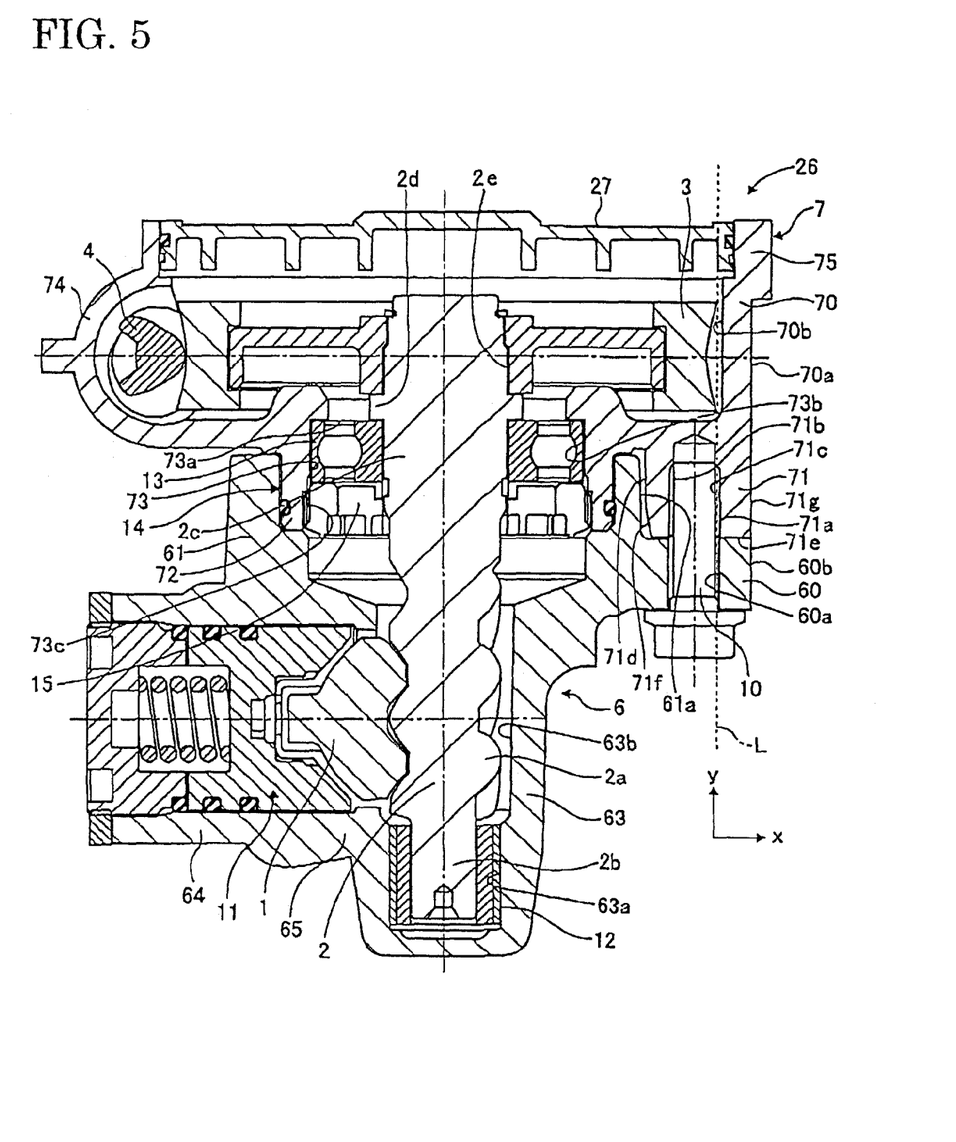
FIG. 5 is a cross-sectional view of a power steering mechanism in a second embodiment according to the present invention.
Figure 6:
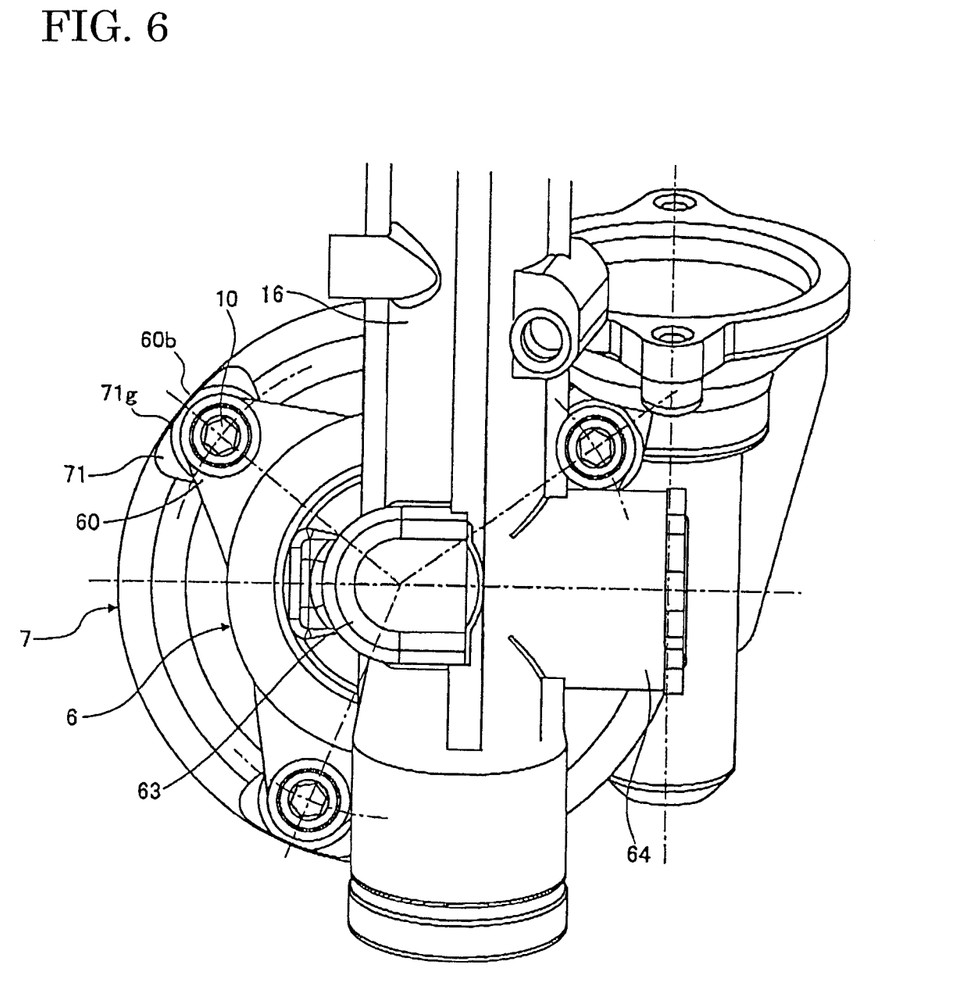
FIG. 6 is a view showing a reduction, gear housing in the second embodiment.

FIG. 5 is a cross-sectional view of a power steering mechanism 26, cut by a plane including the axis of a second pinion shaft 2. FIG. 6 is a view of a reduction gear housing 25 as viewed in the axial direction from a tip side of the second pinion shaft 2.

(Configuration of Second Housing)

Radially outside a second-bearing holding portion 73, second bolt bosses 71 are formed at three spots of a second housing 7 along the circumferential direction of the second housing 7 so as to surround the second-bearing holding portion 73. Each of the three second bolt bosses 71 is formed to independently protrude in the negative direction of y-axis. That is, the three second bolt bosses 71 protrude toward the side of the first housing 6 in a separated manner from one another, as shown in FIG. 6. Each of the second bolt bosses 71 is formed with a female-threaded portion 71a which opens in the negative direction of y-axis. A deepest portion of each female-threaded portion 71a is located beyond the worm-wheel accommodating portion 70 with respect to the negative direction of y-axis. Moreover, a female-thread outermost portion 71c located in an outermost side (with respect to the radial direction of the worm-wheel accommodating portion 70) of an inner circumferential surface of the female-threaded portion 71a, i.e., a site indicated by a dotted line L in FIG. 5 is located beyond an inner circumferential surface 70b of the worm-wheel accommodating portion 70 of the second housing 7 in the radially inner direction of the worm-wheel accommodating portion 70. That is, an outermost portion of the female-threaded portion 71a with respect to the radial direction of the second pinion shaft 2 has a shorter distance to the axis of the second pinion shaft 2 than a distance between the axis of the second pinion shaft 2 and the inner circumferential surface 70b of the worm-wheel accommodating portion 70. A radially-outermost portion 71g located in an outermost side (with respect to the radial direction of the worm-wheel accommodating portion 70) of an outer circumferential surface of the second bolt boss 71 is formed at the same location as an outer circumferential surface 70a of the worm-wheel accommodating portion 70 with respect to the radial direction of the worm-wheel accommodating portion 70. That is, a distance between the axis of the second pinion shaft 2 and the radially-outermost portion 71g is substantially equal to a distance between the axis of the second pinion shaft 2 and the outer circumferential surface 70a.

(Configuration of First Housing)

A first bolt boss 60 is formed at a location beyond a pinion-teeth accommodating portion 63b in the positive direction of y-axis (i.e., is located closer to the y-axis positive side than the pinion-teeth accommodating portion 63b). Also, the first bolt boss 60 is located radially outside the pinion-teeth accommodating portion 63b with respect to the radial direction of the second pinion shaft 2 (i.e., is located on the outer circumferential side of the pinion-teeth accommodating portion 63b). In this embodiment, three first bolt bosses 60 are formed at three spots arranged in a circumferential direction around the axis of the pinion-shaft accommodating portion 63. Each of the three first bolt bosses 60 faces (is opposed to) the second bolt boss 71. A radially-outermost portion 60b located in an outermost side (with respect to the radial direction of the worm-wheel accommodating portion 70) of an outer circumferential surface of the first bolt boss 60 is formed at the same location as the outer circumferential surface 70a of the worm-wheel accommodating portion 70 with respect to the radial direction of the worm-wheel accommodating portion 70. That is, a distance between the axis of the second pinion shaft 2 and the radially-outermost portion 60b is substantially equal to a distance between the axis of the second pinion shaft 2 and the outer circumferential surface 70a.

[Operations]

In the electric power steering device 100 according to the second embodiment, the female-threaded portion 71a is formed such that the female-thread outermost portion 71c which is a radially outermost portion of the inner circumferential surface of the female-threaded portion 71a is located inside beyond the inner circumferential surface 70b of the worm-wheel accommodating portion (i.e., worm-wheel accommodating wall) 70 of the second housing 7 with respect to the radial direction of the second pinion shaft 2. Accordingly, the second bolt boss 71 can be formed at a location more inside with respect to the radial direction of the second pinion shaft 2 (=the radial direction of the worm-wheel accommodating portion 70) than the worm-wheel accommodating portion (wall) 70.

Moreover, in the electric power steering device 100 according to the second embodiment, the first bolt boss 60 and the second bolt boss 71 are formed so that the radially-outermost portions 60b and 71g (with respect to the radial direction of the worm-wheel accommodating portion 70) of the outer circumferential surfaces of the first and second bolt boss 60 and 71 sit at a same radial location (with respect to the radial direction of the worm-wheel accommodating portion 70) as the outer circumferential surface 70a of the worm-wheel accommodating portion 70 of the second housing 7. Thereby, the outer circumferential surface 70a and the radially-outermost portions 60b and 71g form a straight line parallel to the axis of the second pinion shaft 2, in a cross-sectional view cut by a plane including the axis of the second pinion shaft 2, as shown in FIG. 5. Accordingly, with respect to the radial direction of the second pinion shaft 2, each of the radially-outermost portions of the first bolt boss 60 and the second bolt boss 71 can be formed in a shape which does not bulge (project) from the outer circumferential surface 70a of the worm-wheel accommodating portion 70.

[Effects]

Some technical structures obtainable from the second embodiment according to the present invention will now be listed with their advantageous effects.

[o] A radially-outermost portion (71c) of the inner circumferential surface of the female-threaded portion (71a) with respect to the radial direction of the pinion shaft (2) is located more inwardly with respect to the radial direction of the pinion shaft (2) than the inner circumferential surface (70b) of the worm-wheel accommodating portion (70) of the second housing (7). Accordingly, the second bolt boss (71) can be formed at a location more inside with respect to the radial direction of the pinion shaft (2) than the worm-wheel accommodating portion (70). Hence, the radial dimensions of the first housing (6) and the second housing (7) can be reduced, so that the electric power steering device (100) can be downsized.

[p] The first bolt boss (60) and the second bolt boss (71) are formed such that radially-outermost portions (60b, 71g) of the first bolt boss (60) and the second bolt boss (71) with respect to the radial direction of the pinion shaft (2) sit at the same radial location with respect to the radial direction of the pinion shaft (2) as the outer circumferential surface (70a) of the worm-wheel accommodating portion (70) of the second housing (7). Accordingly, with respect to the radial direction of the second pinion shaft (2), each of the radially-outermost portions of the first bolt boss (60) and the second bolt boss (71) can be formed in a shape which does not bulge (project) from the outer circumferential surface (70a) of the worm-wheel accommodating portion (70). Hence, the radial dimensions of the first housing (6) and the second housing (7) can be reduced, so that the electric power steering device (100) can be downsized.

[Other Embodiments]

Although the present invention has been described above with reference to the first and second embodiments of the present invention, the present invention is not limited to the embodiments described above. Modifications and variations of the embodiments described above will occur to those skilled in the art in light of the above teachings.

For example, in the electric power steering device 100 according to the second embodiment, the first bolt boss 60 and the second bolt boss 71 are formed so that the radially-outermost portions 60b and 71g (with respect to the radial direction of the worm-wheel accommodating portion 70) of the outer circumferential surfaces of the first and second bolt boss 60 and 71 sit at the same radial location (with respect to the radial direction of the worm-wheel accommodating portion 70) as the outer circumferential surface 70a of the worm-wheel accommodating portion 70 of the second housing 7. However, according to the present invention, the first bolt boss 60 and the second bolt boss 71 may be formed so that the radially-outermost portions 60b and 71g are located radially-inside beyond the outer circumferential surface 70a of the worm-wheel accommodating portion 70 of the second housing 7, with respect to the radial direction of the worm-wheel accommodating portion 70. Accordingly, with respect to the radial direction of the worm-wheel accommodating portion 70 (=radial direction of the second pinion shaft 2), each of the radially-outermost portions of the first bolt boss 60 and the second bolt boss 71 can be formed in a shape which does not bulge (project) from the outer circumferential surface 70a of the worm-wheel accommodating portion 70.

This application is based on prior Japanese Patent Application No. 2012-066091 filed on Mar. 22, 2012. The entire contents of this Japanese Patent Application are hereby incorporated by reference.

The scope of the invention is defined with reference to the following claims.

What is claimed is:

1. An electric power steering device adapted to apply a steering force to a steerable road-wheel, the electric power steering device comprising:
   a rack bar configured to transmit a steering manipulation of a steering wheel to the steerable road-wheel;
   a pinion shaft meshing with the rack bar;
   a worm wheel provided on the pinion shaft;
   a worm shaft meshing with the worm wheel;
   an electric motor provided on the worm shaft and configured to generate the steering force to be applied to the steerable road-wheel;
   a first housing accommodating at least a part of the rack bar and at least a part of the pinion shaft, wherein the first housing includes a first bolt boss formed with a though-hole;
   a second housing including
      a worm-wheel accommodating potion accommodating the worm wheel, and
      a second bolt boss provided to have a shorter distance to the first housing than that of the worm-wheel accommodating portion, and formed with a female-threaded portion opened toward the first housing, wherein the second bolt boss is opposed to the first bolt boss to cause the female-threaded portion to be continuous with the through-hole of the first bolt boss; and
      a bolt inserted from the first bolt boss toward the second bolt boss and fastening the first housing to the second housing,
   wherein the female-threaded portion is formed such that a radially-innermost portion of an inner circumferential surface of the female-threaded portion with respect to a radial direction of the pinion shaft is located more inwardly with respect to the radial direction of the pinion shaft than an outer circumferential surface of the worm-wheel accommodating portion of the second housing.

2. The electric power steering device according to claim 1, wherein
   the radially-innermost portion of the female-threaded portion is located more inwardly with respect to the radial direction of the pinion shaft than an inner circumferential surface of the worm-wheel accommodating portion of the second housing.

3. The electric power steering device according to claim 2, wherein
   a radially-outermost portion of the inner circumferential surface of the female-threaded portion with respect to the radial direction of the pinion shaft is located more inwardly with respect to the radial direction of the pinion shaft than the inner circumferential surface of the worm-wheel accommodating portion of the second housing.

4. The electric power steering device according to claim 1, wherein
   the first bolt boss and the second bolt boss are formed such that radially-outermost portions of the first bolt boss and the second bolt boss with respect to the radial direction of the pinion shaft are located more inwardly with respect to the radial direction of the pinion shaft than the outer circumferential surface of the worm-wheel accommodating portion of the second housing, or sit at the same radial location as the outer circumferential surface of the worm-wheel accommodating portion of the second housing.

5. An electric power steering device adapted to apply a steering force to a steerable road-wheel, the electric power steering device comprising:
   a rack bar configured to transmit a steering manipulation of a steering wheel to the steerable road-wheel;
   a pinion shaft meshing with the rack bar;
   a worm wheel provided on the pinion shaft;
   a worm shaft meshing with the worm wheel;

an electric motor provided on the worm shaft and configured to generate the steering force to be applied to the steerable road-wheel;

a first housing accommodating at least a part of the rack bar and at least a part of the pinion shaft, wherein the first housing includes a first bolt boss formed with a through-hole:

a second housing including
- a worm-wheel accommodating portion accommodating the worm wheel, and
- a second bolt boss provided to have a shorter distance to the first housing than that of the worm-wheel accommodating portion, and formed with a female-threaded portion opened toward the first housing, wherein the second bolt boss is opposed to the first bolt boss to cause the female-threaded portion to be continuous with the through-hole of the first bolt boss; and
- a bolt inserted from the first bolt boss toward second bolt boss and fastening the first housing to the second housing, wherein the first housing is formed to protrude toward the second housing, the first housing further includes a first cylindrical engaging portion inside which the pinion shaft is accommodated, the second housing is formed to protrude toward the first housing, the second housing includes a second cylindrical engaging portion inside which the pinion shaft is accommodated, the second cylindrical engaging portion is engaged with the first cylindrical engaging portion, a plurality of second bolt bosses including the second bolt boss are arrayed along a circumferential direction of the second housing, and the plurality of second bolt bosses protrude toward the first housing independently from one another with respect to the circumferential direction of the second housing.

6. The electric power steering device according to claim 5, wherein the first housing further includes a rack-bar accommodating portion accommodating the rack bar, a pinion-shaft accommodating portion accommodating the pinion shaft, and a retainer accommodating portion accommodating a rack retainer biasing the rack bar toward the pinion shaft, and one of a plurality of first bolt bosses provided opposed to the plurality of second bolt bosses is located between the rack-bar accommodating portion and the retainer accommodating portion with respect to the circumferential direction of the pinion shaft.

7. The electric power steering device according to claim 5, wherein the second cylindrical engaging portion is engaged with the first cylindrical engaging portion by being inserted into the first cylindrical engaging portion, and a radially inner side-surface of each of the plurality of second bolt bosses with respect to a radial direction of the pinion shaft is formed in a shape conforming to a shape of a radially outer side-surface of the first cylindrical engaging portion.

8. The electric power steering device according to claim 7, wherein the radially inner side-surface of the second bolt boss includes a tapered portion whose curvature radius about an axis of the pinion shaft becomes larger toward the first bolt boss.

9. The electric power steering device according to claim 5, wherein the first housing is equipped with a first bearing that rotatably supports the pinion shaft, the second housing includes a second-bearing holding portion holding a second bearing that rotatably supports the pinion shaft, and the second bearing is located between the first bearing and the worm wheel.

10. The electric power steering device according to claim 9, wherein the second cylindrical engaging portion is engaged with the first cylindrical engaging portion by being inserted into the first cylindrical engaging portion.

11. The electric power steering device according to claim 10, wherein the first cylindrical engaging portion cooperates with the second cylindrical engaging portion to form a spigot-and-socket connection portion.

12. The electric power steering device according to claim 11, wherein the spigot-and-socket connection portion is located to overlap with the female-threaded portion along the axial direction of the pinion shaft.

13. The electric power steering device according to claim 10, wherein an opposed surface of the second bolt boss which is opposed to the first bolt boss is parallel to a second-bearing holding-portion bottom surface of the second-bearing holding portion which is in contact with an axial end surface of the second bearing.

14. The electric power steering device according to claim 13, wherein a surface-treatment by machine work is applied to a second-bearing holding-portion inner circumferential surface of the second-bearing holding portion which is in contact with an outer circumferential surface of the second bearing.

* * * * *